United States Patent [19]

McGriff

[11] 4,210,184
[45] Jul. 1, 1980

[54] CIRCULAR RESAW APPARATUS AND METHOD

[75] Inventor: Douglas H. McGriff, Portland, Oreg.

[73] Assignee: Producto Machinery Corporation, Portland, Oreg.

[21] Appl. No.: 873,711

[22] Filed: Jan. 30, 1978

[51] Int. Cl.² .................. B27B 1/00; B27B 31/00; E05F 13/00
[52] U.S. Cl. .................. 144/312; 83/169; 83/171; 83/436; 83/449; 51/267; 125/13 R; 144/246 F; 144/249 B; 198/789
[58] Field of Search ............. 83/169, 171, 425, 435 R, 83/435 L, 436, 437, 438, 441.1, 444, 449, 155.1; 144/312, 246 R, 246 F, 249 R, 249 B; 125/12, 13; 51/267; 198/624, 789

[56] References Cited

U.S. PATENT DOCUMENTS

| | | |
|---|---|---|
| 103,677 | 5/1870 | Stilwell .................. 144/249 B X |
| 1,769,927 | 7/1930 | Langill et al .................. 83/436 X |
| 2,014,222 | 9/1935 | Bieling et al. .................. 125/13 R |
| 2,169,394 | 8/1939 | Richardson .................. 144/246 |
| 3,236,272 | 2/1966 | Lawson .................. 83/436 X |
| 3,540,334 | 11/1970 | McLauchlan .................. 83/169 X |
| 3,674,065 | 7/1972 | Fairfield, Jr. et al .................. 83/169 |
| 3,827,324 | 8/1974 | Allen .................. 83/436 |
| 3,858,631 | 1/1975 | Andersson et al. .................. 144/249 B X |
| 3,981,393 | 9/1976 | Landers .................. 144/246 R |
| 4,116,597 | 9/1978 | Dunstan .................. 198/624 |

Primary Examiner—R. L. Spruill
Assistant Examiner—W. D. Bray
Attorney, Agent, or Firm—Chernoff & Vilhauer

[57] ABSTRACT

A resaw apparatus and method for rapidly and accurately cutting elongate wood cants longitudinally. A thin-kerfed circular saw blade is utilized to cut the cants and a high-speed feed mechanism, having two sets of separately driven dual rollers which pinch the cant therebetween for both moving the cant and determining its direction of movement, urges the cant against the cutting edge of the saw blade. A pair of blade guides mounted on opposite sides of the blade hold the blade in position while water is fed through the blade guides to the side surfaces of the blade, thereby lubricating the blade-guide interface and removing heat generated by the blade guide and cutting of the wood to prevent warping of the blade from heat. The direction of movement of the cants is determined by the orientation of the two sets of rollers, which are mounted on respective movable carriages supported by slides incorporating directional alignment adjustments therein. The width of cant which may be accommodated and the centering of that cant on the saw blade is determined by a readily adjustable positioning mechanism connected to both carriages for adjusting the respective positions of the rollers. A conveyor is also provided for supplying cants to the feed mechanism more rapidly than the feed mechanism can use them, thereby abutting subsequent cants against their predecessors. The feed rollers and conveyor are controlled, powered and synchronized by a hydraulic drive and control system, while a pneumatic system provides the elastic force for pinching the feed rollers together and controlling their separation.

10 Claims, 8 Drawing Figures

CIRCULAR RESAW APPARATUS AND METHOD

BACKGROUND OF THE INVENTION

This invention relates to methods and apparatus for cutting wood, particularly to the use of a resaw for cutting elongate wood cants.

In the lumber products industry it is frequently necessary or at least desirable to utilize a resaw apparatus in a sawmill or lumber yard for cutting wood cants, that is, wood members which have been cut from a log but are destined for further cutting. A resaw is a type of saw utilized to break down cants into smaller pieces, ordinarily to edge a cant or to rip it to the proper thickness. Such a resaw is used, for example, in a sawmill to reduce relatively thick cants coming from a headrig in order to enable more logs to go through the headrig in a given time period, or in a planing mill to reduce the size of boards after they have been planed. In general a resaw is utilized to cut cants to a useful size for whatever purpose they are needed.

Resaws typically incorporate bandsaws and some type of mechanism for feeding the cant to the bandsaw blade. Bandsaws are ordinarily used in such resaw apparatus because they can be constructed with a relatively thin kerf, which minimizes the wood cut from the cant and, therefore, the amount of wood wastage. The feed mechanism typically utilizes a fence or some other means for controlling the direction of the cant as it is urged against the saw blade, and one or more powered rollers for urging the wood cant along a predetermined path into the blade. Where more than one roller is used, the rollers are ordinarily synchronized through the use of elongate axial shafts and gear mechanisms connecting the rollers with one another and with a motor. Although circular saws are sometimes utilized in resaws, they have heretofore only been utilized where the amount of wood removed by a relatively thick-kerfed circular saw blade is acceptable.

There are several problems with conventional resaw apparatus which limit their speed and accuracy, and result in frequent and sometimes extensive maintenance, thereby limiting the productivity of such apparatus. One problem is that, by their nature, bandsaws are relatively slow cutting saws. In addition, bandsaw blades tend to wear relatively faster than, for example, circular saw blades, and when a blade becomes dull it tends to be pushed off its drive wheels by the wood that it is cutting if an attempt is made to maintain the speed of the wood past the blade. Moreover, the accuracy of such a resaw is reduced by such an attempt to maintain speed with a dull saw blade.

It has been recognized, for example in E. Williston, *Lumber Manufacturing: The Design and Operation of Sawmills and Planer Mills* 134-39 (1976), Library of Congress Catalog Card No. 76-6718, that the use of circular saws in resaw apparatus would be desirable because of their relatively low cost, low profile, easy maintenance and simple, rugged construction. Moreover, circular saws provide high speed, less expensive blade sharpening and longer wear than bandsaws, and more resistance to the pressure produced by attempting to maintain cutting speed when the blade is dull. However, circular saws ordinarily require a relatively thick kerf, since a thin-kerfed blade tends to waver in position due to the pressure from the wood that it is cutting and the heat generated by cutting, thereby producing an inaccurate cut.

In addition, the known means for feeding a cant to the cutting blade of a resaw are typically not easily adjustable for direction, centering or cant thickness. Moreover, the complex mechanisms which urge a cant against the cutting blade, often utilizing rollers mounted on elongate axles and connected by gear linkages, reduce in accuracy with wear and must usually be rebuilt in order to eliminate this inaccuracy. Accordingly, there is a need for an improved resaw apparatus and method for increasing the speed of cutting cants while maintaining or improving accuracy and minimizing maintenance.

SUMMARY OF THE INVENTION

The present invention overcomes the drawbacks of prior art resaws by providing a novel resaw apparatus and method utilizing a high speed, thin-kerfed circular saw which keeps the amount of wood wastage within acceptable limits, yet achieves a high cutting accuracy with low maintenance. A novel feed mechanism is provided which is readily adjustable to accomodate various size cants and to compensate for machine wear to avoid deterioration in accuracy.

In order to utilize a thin-kerfed circular blade, a pair of blade guides are placed on both sides of the blade close to the portion of the cutting edge initially making contact with the wood which is cut. In addition, the blade is cooled by water flowing through the blade guides against the sides of the blade and between the guides and the blade, which removes heat generated by friction from the blade guides as well as the wood being cut, and reduces the guide friction by creating a lubricating film of water between the guides and the blade. The guides maintain the lateral position of the blade's cutting edge within acceptable limits, and the cooling prevents the blade from warping due to heat, thereby maintaining the accuracy of the cut. The guide support structure enables the lateral position of the guides with respect to the blade to be adjusted, which increases the life of the blade guides, and a swivel joint enables a cooling water conduit to be left connected to the guide while it is adjusted, which reduces the down time of the apparatus necessary for adjustment.

A high speed, highly accurate cant feed mechanism is provided by two sets of cylindrical, vertically-oriented rollers disposed on opposite sides of a predetermined cant feed path, between which the cant is pinched and by which the cant is urged against the saw blade. Each such set includes at least two such rollers whose tangents define a vertically-oriented plane, the two sets defining two planes whose lateral separation determines the width of cant that can be accommodated and whose respective orientations and lateral positions determine the direction and centering respectively of the cant relative to the saw blade. For this reason, the feed mechanism is provided with a novel means for positioning those rollers, and aligning those planes.

In order to reduce inaccuracies produced by wear on roller support and drive parts, and to synchronize the rollers at the same speed for directional accuracy, each set of rollers is mounted on a separate carriage along with a corresponding hydraulic drive motor, the two motors being connected in series for synchronization, thereby eliminating the conventional complicated drive linkage mechanisms used to power two or more rollers with a single motor. Also, the two carriages are mounted on special wear-compensable slides which permit their lateral positions and alignment readily to be adjusted.

A rocker arm linkage mechanism connected to both carriages and to a support frame permits both the centering and separation of the two carriages to be adjusted. Also, a two stage pneumatic cylinder incorporated within that linkage mechanism provides the necessary elastic force for urging the rollers against the cant pinched therebetween, enables the rollers to be separated a predetermined slight amount to accomodate scant, that is unusually narrow pieces of wood, and permits the rollers to be separated in other predetermined, larger amounts for removal of wood and machinery parts from between the rollers.

A conveyor is included preceeding the feed mechanism in the path of the cants for moving cants longitudinally into the feed mechanism between the two sets of rollers. To facilitate uninterrupted operation of the resaw while taking advantage of the high speed with which cants may be fed to the saw by the feed mechanism, the conveyor, which utilizes a trough and an endless conveyor belt, is adapted to move the boards more rapidly than the feed mechanism itself, thereby abutting the end of each cant against its preceeding cant. This is accomplished by setting the conveyor drive to produce a higher linear speed in the cant than the feed mechanism itself, but synchronizing the conveyor with the feed so that the speed relationship between the conveyor and the feed is maintained regardless of the speed of operation of the apparatus, which is accomplished by utilizing a hydraulic motor in series with the feed drive motors to drive the conveyor belt.

Therefore, it is a principal objective of the present invention to provide a new and improved resaw apparatus and method for cutting elongate wood cants along their longitudinal dimension.

It is another objective of the present invention to provide such a resaw apparatus and method which can be used to cut such cants at a relatively high speed with high accuracy while keeping wood wastage within acceptable limits.

It is a further objective to provide a readily adjustable resaw apparatus which reduces maintenance requirements and inaccuracies resulting from wear.

It is a principal feature of the present invention that it utilizes a relatively thin-kerfed circular saw blade and associated blade guides and cooling means for maintaining the cutting accuracy of the saw blade.

It is another feature of the present invention that it utilizes a high speed feed mechanism having two sets of powered rollers mounted along with respective synchronized drive motors on respective movable carriages for pinching a cant therebetween and accurately urging it against a saw blade along a predetermined path.

It is a further feature of the present invention that it utilizes convenient and reliable means for adusting the position and alignment of the aforementioned carriages.

It is yet another feature of the invention that it is provided with a conveyor for supplying the feed mechanism with cants more rapidly than the feed mechanism urges them against the saw blade thereby facilitating uninterrupted operation.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
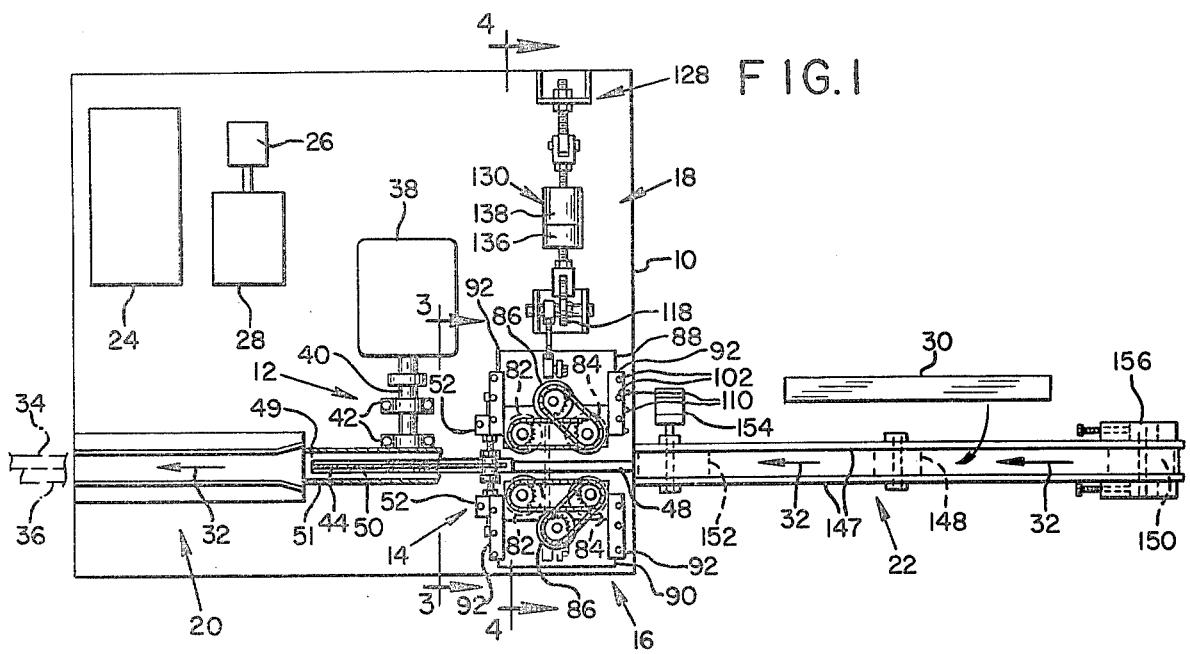
FIG. 1 is a top schematic view of an exemplary resaw apparatus according to the principles of this invention.
Figure 2:
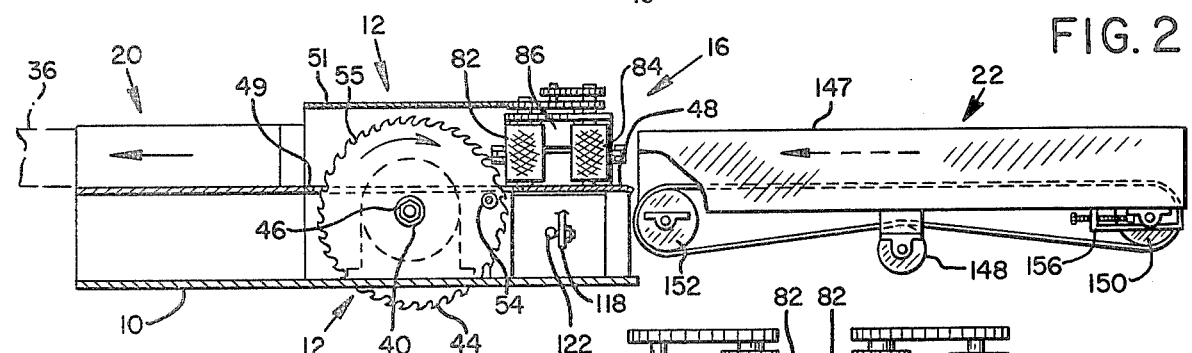
FIG. 2 is a side schematic view of the aforementioned exemplary apparatus, partially cut away.

Referring first to FIGS. 1 and 2, the exemplary resaw apparatus of the present invention utilizes a support frame 10, having a circular saw 12, a saw blade guide mechanism 14, a cant feed mechanism 16, a feed positioning mechanism 18, and an output guide 20 all attached thereto. In addition, the apparatus is provided with an input conveyor 22 attached to the frame 10 for supplying the feed mechanism 16 with wood cants. The feed mechanism and input conveyor are operated by a hydraulic drive and control system having a hydraulic fluid source tank 24, a hydraulic pump 26 connected to a power motor 28, and appropriate hydraulic lines, valves, and drive motors, as shown particularly in FIG. 6 and described hereafter.

In operation of the apparatus, a cant 30 to be cut, ordinarily for reduction to two or more pieces of smaller width, is placed upon the conveyor 22 and thereafter moved in the direction of the arrows 32 longitudinally along a predetermined linear path into the feed mechanism 16. The feed mechanism, which is adjusted for the width of the cant 30 and aligned to move the cant accurately in the proper direction, urges the leading end of the cant into the saw 12 where it is cut longitudinally along a predetermined line with respect to the sides of the cant, ordinarily the center line though not necessarily, producing two finished boards 34 and 36 which leave the resaw by way of the output guide 20.

The circular saw 12 of the resaw utilizes a conventional saw motor 38, separate from the hydraulic system power motor 28 to prevent interaction between the saw speed and the hydraulic system, particularly due to drag on the saw motor during cutting, the saw motor being connected in a conventional manner to a rotatable arbor 40 supported by conventional bearings 42. A relatively thin-kerfed circular saw blade 44, as utilized by this invention for minimizing wood wastage, is attached to and rotated by the arbor 40 in a conventional manner, such as a nut 46 engaging the threaded end of the arbor, for cutting the wood cant. The apparatus includes and elongate, relatively narrow table having a flat, horizontally-oriented plate with a feed portion 48 and saw portion 49 for supporting the cant as it moves through the feed mechanism 16 and saw 12, the saw portion having a slot 51 therein for accepting the saw blade, and the saw preferably includes a shield 50 attached to the saw portion 49 of the table to cover the saw blade and prevent injury to operators of the saw.

Figure 3:
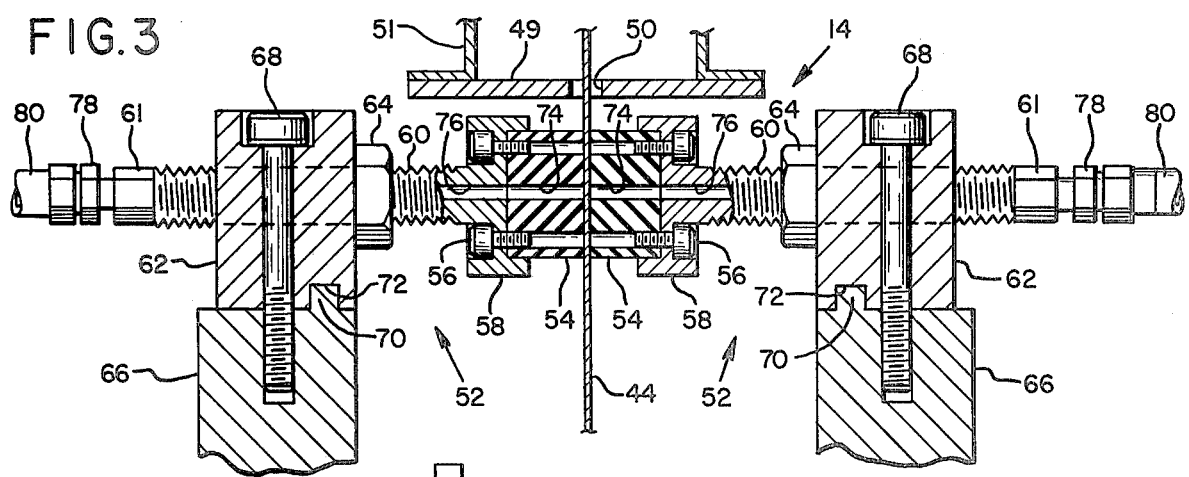
FIG. 3 is a section view of the aforementioned exemplary resaw apparatus taken along line 3—3 of FIG. 1, showing an adjustable saw blade guide mechanism.

Turning now to FIG. 3, as well as FIGS. 1 and 2, the guide mechanism 14 comprises two adjustable guides 52 disposed on opposite sides of the saw blade 44 on the cutting side of the arbor 40, below the table 49, and as close to the cutting portion of the blade as practicable, for holding the blade in place to keep lateral movement of the blade within a predetermined tolerance. The blade is held in place by a pair of wear and heat resistant guide pads 54 whose edges preferably should be placed within about ¼ inch from the bottom of the table supporting plate and the base of the blade gullets 55, see FIG. 2, to place the pads as close as possible to the position where the wood is cut while providing enough clearance for their convenient removal. The pads are removably attached, preferably by bolts 56, to a respective pair of pad mounts 58 having threaded shafts 60 which are threadingly inserted into respective guide bodies 62 so that, by rotating the shafts, the lateral position of the guide pads 54 with respect to the saw blade may be changed. The position of each shaft 60, and thus its guide pad, is fixed by tightening a nut 64 or some other appropriate threaded fastener, and the end 61 of the shaft is preferably provided with a hexagonal or other convenient shape for engagement by a wrench to adjust the guides. Each guide body 62 is attached to a respective alignment block 66 by an appropriate fastener, such as bolt 68, the alignment block being attached to the frame 10, and the key 70 of the block and keyway 72 of the guide body serve to insure that the guide block will be returned to the same position when it is removed for replacement of the guide pad 54, or the like.

In addition to maintaining the lateral position of the saw blade 44, the blade guides provide a means for cooling the blade and lubricating the blade-guide interface. Accordingly, the guide pads 54 have an elongate, hollow passage 74 formed therein and the pad mounts 58 also have a shaft 76 formed therein coincident with the passages 74 in the pads and extending through the shafts 60 for leading cooling fluid, ordinarily water, to the surface of the saw blade for removing heat generated by the friction of the pads against the blade and by the cutting of the wood. This arrangement also tends to form a film of water between the blade and the guide, which reduces friction. A swivel joint 78 is attached to the end 61 of each guide shaft for connecting a water hose 80 to the guide shaft passage 76 while permitting the shaft to be rotated for adjustment of the position of the guide pad, without twisting or disconnecting the water hose 80.

Figure 4:
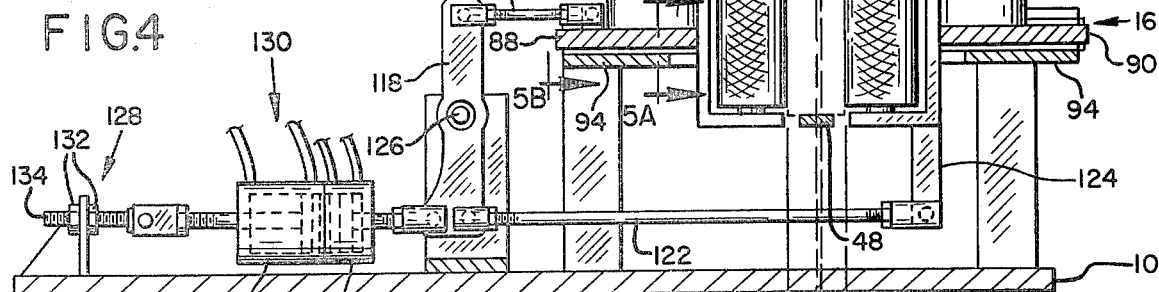
FIG. 4 is a section view of the aforementioned exemplary apparatus taken along line 4—4 of FIG. 1, showing a novel cant feed mechanism thereof.

As shown in FIG. 4, as well as FIGS. 1 and 2, the feed mechanism 16 utilizes two sets of powered cylindrical forward and rearward feed rollers 82 and 84, whose axes are vertically oriented substantially perpendicular to the surface of the table 48, each set being disposed on opposite sides of the cant path for pinching a cant therebetween and urging it against the cutting edge of the saw blade 44. Each set of forward and rearward rollers is powered by a respective hydraulic drive motor 86 which is linked to its rollers by conventional chains and sprockets, or some other appropriate non-slip linkage which rotates the cylinders on their axes to urge the cant forward into the saw blade. While it is preferred that both rollers of each set be driven, it is recognized that only one roller might be driven, with significant deterioration in the smooth operation of the system.

The width of a cant that can be accepted by the resaw apparatus is determined primarily by the lateral separation 87 of the two sets of rollers, and the direction of movement of the cant is determined by the orientation and alignment of the two vertical planes defined respectively by tangents to the cylindrical surfaces of the two rollers of each respective set. Accordingly, the two sets of rollers and corresponding drive motors are mounted respectively on carriages 88 and 90 located on opposite sides of the cant path, and each of the carriages is movably attached by a pair of slides 92 to the frame 10 for permitting the carriages to be positioned with respect to the saw blade for adjusting the separation, centering and alignment of the carriages, and thus the rollers.

Figure 5A:
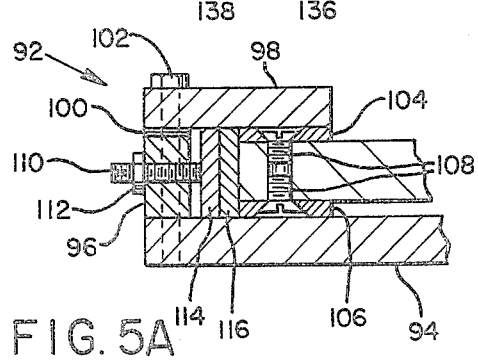
FIG. 5A is a section view of a carriage slide portion of the aforementioned feed mechanism taken along line 5A—5A of FIG. 4.
Figure 5B:
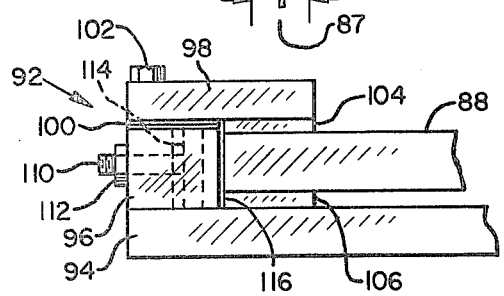
FIG. 5B is an end view of the aforementioned slide portion of the feed mechanism taken along line 5B—5B of FIG. 4.

Referring now to FIG. 5A, each pair of slides is attached to a base plate 94, connected to the frame 10 for supporting its respective carriage, and each slide comprises a C-shaped gib plate 96 disposed at a forward or rearward edge of the base plate, with respect to the cant path, depending upon the particular slide; a hold down plate 98 attached to the top of the gib plate to form a space between the hold down plate and the base plate 94; ordinarily at least one shim 100 between the hold down plate and the gib plate; and an appropriate means for fastening the base plate, gib plate and hold down plate together, such as the plurality of bolts 102. A slidable joint is formed by the placement of a corresponding edge of the corresponding carriage, which is ordinarily made of steel, within the space between the hold down plate and the base plate, separated therefrom by top bushings 104 and bottom bushings 106, preferably made of brass or some other appropriate relatively soft material, which are replaceably attached to the carriage by conventional means such as screws 108, the replaceably bushings reducing wear on the permanent steel parts. The gib plate is provided with a plurality of horizontally-oriented alignment bolts 110 and fastening nuts 112 for adjusting the angular alignment of the carriage with respect to the cant path, and thus the alignment of the rollers themselves. The alignment bolts push against a pressure distribution plate 114, ordinarily made of steel, which is disposed within the space between the hold down plate and the base plate and is separated from the edge of the carriage by an edge bushing 116, preferably made of brass, similar to the top and bottom bushings 104 and 106. The ends of the gib plate wrap around the ends of the pressure plate and edge bushing to prevent them from moving longitudinally out of position, as shown in FIG. 5B.

The slides permit the two carriages to move back and forth laterally relative to the saw blade and cant path for adjustment of the space 87 between the two sets of rollers and the centering of that space relative to the saw blade, and the alignment bolts adjust the orientation of the planes defined by the rollers, which determines the direction of movement of the cants.

Lateral adjustment of the carriages is provided by the positioning mechanism 18, as particularly shown in FIGS. 1,2 and 4. The carriage 88 is connected to the top end of a rocker arm 118 by a pivotally attached, adjustable linkage rod 120. The carriage 90 is similarly connected to the other end of the rocker arm by a second adjustable linkage arm 122, the second arm passing beneath the base plates 94 and linking with carriage 90 by a downwardly-protruding tab 124. The rocker arm 118 is, in turn, pivotally attached to the frame 10 at a center point 126 so that when the rocker arm moves clockwise, as shown in FIG. 4, the two carriages, and their respective rollers, approach one another reducing the space 87, but when the rocker arm moves counterclockwise the two sets of rollers are separated, opening that space. In addition, the lengths of the linkages 120 and 122 are adjustable to vary the relative positions of the rollers and the centering of the space between the rollers with respect to the saw blade. Preferably this adjustment is accomplished by using rods with threaded ends inserted into threaded receptacles at their attachment points to the carriages and rocker arm, the carriage and rocker arm ends having opposite threads so that when a rod is rotated the effective length of its linkage is changed; however, any appropriate length adjustment device might be used.

The rocker arm is also pivotally connected to the frame 10 through a manual space adjustment 128 and through a double-section air cylinder 130, both of which serve to vary the effective length of this connection. Although a variety of mechanisms might be used, the manual adjustment 128 preferably comprises a pair of fastening nuts 132 and a threaded rod 134 pivotally attached to one end of the air cylinder 130, while the other end of the air cylinder is pivotally attached to the rocker arm 118. The manual adjustment determines the basic separation 87 of the two sets of rollers, and may be changed to accommodate different sized cants. The first section 136 of the air cylinder retracts the rocker arm-frame linkage a predetermined short amount, typically ⅛ inch, upon command thereby producing a reduction in the spacing between the two sets of rollers of ¼ inch, (where the rocker arm-frame linkage and a rocker arm-carriage are aligned), in order to adjust for scant, that is unusually narrow, boards. The second air cylinder section 138 extends the rocker arm-frame linkage a predetermined larger amount, typically 2 inches, upon command in order to separate the two sets of rollers for removal of cants and the table portion 49 or other parts for maintenance of the equipment.

Together, the two sections of the air cylinder also provide the necessary elastic force for pinching a cant between the rollers. The slides 92 supporting the roller carriages are located vertically halfway between the ends of the two rollers in order to minimize the amount of rotational torque produced by the pinching force applied laterally to the rollers and the deviation from vertical positioning at either end of the rollers due to wear of the carriage and slide parts, thereby increasing accuracy and minimizing maintenance. Accordingly, this center position is also located above the feed portion 48 of the supporting plate and preferably at a position in the center of most cants to be cut.

Figure 6:
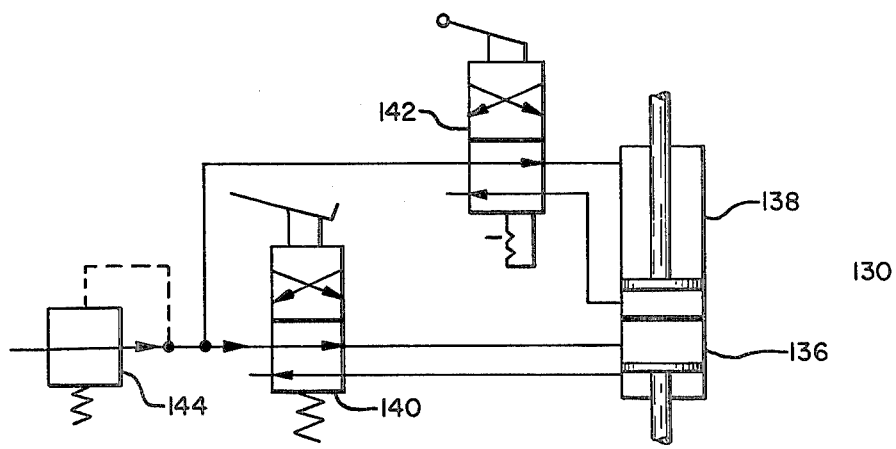
FIG. 6 is a schematic diagram of an exemplary pneumatic control system for the feed mechanism of the resaw apparatus.

As shown in FIG. 6, the air cylinder 130 is operated by a pneumatic control system of a conventional type utilizing a foot operated, spring-return valve 140 for actuating the first short section of the cylinder 136, and a hand operated valve 142 for actuating the second long section of the air cylinder 138, both of which are connected through a pressure regulator 144 for providing each valve with constant pressure to a conventional source of air pressure.

Referring again to FIGS. 1 and 2, the conveyor 22 utilizes an endless conveyor belt 146 disposed near the bottom of two side walls 147, forming a trough of appropriate width and depth for guiding a predetermined size cant longitudinally into the space between the rollers of the feed mechanism, two idler rollers 148 and 150 for supporting the belt beneath the trough in a conventional manner, and a powered roller 152 driven by a hydraulic motor 154. The conveyor belt also is held in proper tension by a tension adjustment mechanism 156.

Figure 7:
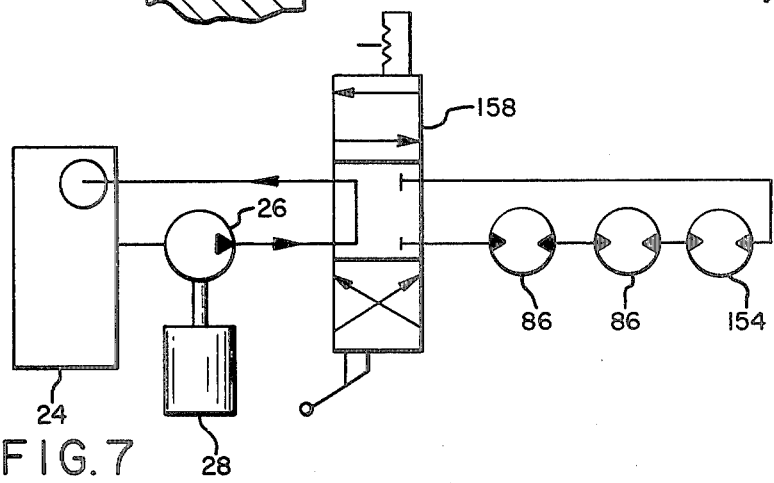
FIG. 7 is a schematic diagram of an exemplary hydraulic drive and control system for the resaw apparatus of the present invention.

Although other equivalent drive and control mechanisms might be utilized to operate the feed rollers and conveyor, an exemplary preferred hydraulic system is shown in FIG. 7. In this system the feed roller hydraulic motors 86 and the conveyor hydraulic motor 154 are connected in series so that they are all synchronized. However, since the conveyor is to propel the cants at a higher linear speed than the feed mechanism so that the conveyor supplies cants to the feed mechanism faster than the feed mechanism urges them into saw thereby abutting subsequent cants against their predecessors for uninterrupted operation and maximum speed in cutting cants, the conveyor motor 154 is preferably chosen to operate at a higher speed than motors 86, although the same result might be achieved, for example, by an appropriate choice of sprocket and roller sizes. The actuation and direction of movement of the feed rollers and conveyor are controlled by a manually-operated, three position hydraulic valve 158 permitting forward, neutral and reverse modes. The valve in turn is fed by the pump 26, driven by the power motor 28, which draws hydraulic fluid from the source tank 24 and returns it thereto. If desired, conventional means, such as a variable displacement pump and a flow control valve, can be utilized in the system to vary the speed of the cants and thus the cants flowing through the apparatus.

Although the foregoing apparatus is designed for splitting a single cant of limited width into two pieces, it is recognized that various width cants might be accomodated by the apparatus and that more than one blade might be provided for splitting a cant into more than one piece without departing from the principles of the invention. Moreover, equivalent drive and control mechanisms might be utilized to obtain the same advantages as this apparatus, and a different feed mechanism might be combined with the water cooled circular saw and blade guides, albeit to a lesser advantage.

The terms and expressions which have been employed in the foregoing abstract and specification are used therein as terms of description and not of limitation, and there is no intention in the use of such terms and expressions, of excluding equivalents of the features shown and described or portions thereof, it being recognized that the scope of the invention is defined and limited only by the claims which follow.

What is claimed is:

1. A resaw apparatus for longitudinally cutting an elongate wood cant, comprising:
 (a) a circular saw for cutting said cant, said saw including a vertically-oriented circular saw blade and means for rotating said blade, said blade having two laterally-facing sides, a center axis of rotation, and a cutting edge, a portion of said cutting edge passing through a forward position for cutting said cant as said blade is rotated;
 (b) table means disposed adjacent said blade for supporting said cant as it is cut by said saw, said table means having a flat horizontally-oriented supporting plate;

(c) guide means disposed adjacent said sides of said saw blade between the respective horizontal locations of said center axis and said forward position for keeping lateral movement of said blade within a predetermined tolerance;

(d) two sets of cylindrical rollers disposed on opposite sides of a predetermined path and defining a space therebetween for urging said cant longitudinally along said predetermined path against said saw blade at said forward position such that said cant is cut longitudinally along a predetermined line, each set having two such rollers whose axes are oriented substantially perpendicular to said supporting plate;

(e) pressure means connected to said two sets of rollers for urging said sets toward one another such that they pinch said cant therebetween;

(f) drive means connected to said rollers for rotating said rollers about their respective axes to urge said cant along said path;

(g) two movable carriages for supporting said two sets of rollers respectively, and slide means connected to said table means for supporting said carriages and permitting movement thereof laterally while constraining movement longitudinally with respect to said cant path; and (h) a rocker arm pivotally attached to said table means at a center rocker-arm axis, a first adjustable linkage connected between said rocker-arm on one side of said rocker-arm axis and said table means for adjusting the pivotal position of said rocker arm with respect to said table means, a second linkage connected to said rocker arm on a first side of said rocker-arm axis and to a first said carriage, and a third linkage connected to a side of said rocker arm opposite said first side and to a second said carriage.

2. The apparatus of claim 1 wherein said second and third linkages each include means for varying their effective length to adjust the positions of said first and second carriages respectively relative to said rocker arm and to each other.

3. The apparatus of claim 1 wherein said pressure means comprises a pneumatic cylinder included within said first linkage, a first end of said cylinder being connected to said rocker arm and another end thereof, movable with respect to said first end, being connected to said table means, and pneumatic control means connected to said cylinder for charging and operating said cylinder.

4. The apparatus of claim 3 wherein said pneumatic cylinder comprises two separately-operable double-action sections connected in series with one another.

5. A resaw apparatus for longitudinally cutting an elongate wood cant, comprising:
(a) a circular saw for cutting said cant, said saw including a vertically-oriented circular saw blade and means for rotating said blade, said blade having two laterally-facing sides, a center axis of rotation, and a cutting edge, a portion of said cutting edge passing through a forward position for cutting said cant as said blade is rotated;

(b) table means disposed adjacent said saw blade for supporting said cant as it is cut by said saw, said table means having a flat horizontally-oriented supporting plate;

(c) two sets of cylindrical rollers disposed on opposite sides of a predetermined path and defining a space therebetween for urging said cant longitudinally along said predetermined path against said saw blade at said forward position such that said cant is cut longitudinally along a predetermined line, each set having two such rollers whose axes are oriented substantially perpendicular to said supporting plates;

(d) pressure means connected to said two sets of rollers for urging said sets toward one another such that they pinch said cant therebetween;

(e) drive means connected to said rollers for rotating said rollers about their respective axes to urge said cant along said path;

(f) two movable carriages for supporting said two sets of rollers respectively;

(g) slide means connected to said table means for supporting said carriages and permitting movement thereof laterally while constraining movement longitudinally with respect to said cant path; and (h) lateral adjustment means connected to said table and said carriages for moving said carriages laterally on said slide means relative to said cant path, said carriages movably engaging said slide means at elongate, laterally extending joints, said joints being centered substantially halfway between the ends of said rollers.

6. The apparatus of claim 5 further comprising lateral adjustment means connected to said table and said carriages for simultaneously moving said two carriages laterally on said slide means in opposite directions relative to said cant path.

7. A resaw apparatus for longitudinally cutting an elongate wood cant, comprising:
(a) a circular saw for cutting said cant, said saw including a circular saw blade and means for rotating said blade, said blade having two laterally facing sides, a center axis of rotation, a cutting edge, a portion of said cutting edge passing through a forward position for cutting said cant as said blade is rotated;

(b) table means disposed adjacent said saw blade for supporting said cant as it is cut by said saw, said table means having a flat supporting plate substantially perpendicular to said blade;

(c) feed means disposed ahead of said forward position for urging said cant longitudinally along a predetermined path against said saw blade such that said cant is cut longitudinally along a predetermined line;

(d) a pair of guide pads disposed adjacent opposite sides of said saw blade ahead of said center axis for keeping lateral movement of said blades within a predetermined tolerance;

(e) a pair of pad mounts attached respectively to each said guide pad for supporting said pad, each said pad mount having an elongate guide shaft disposed longitudinally perpendicular to the sides of said saw blade, said guide pad, pad mount and guide shaft each having a passage for leading a cooling fluid to said saw blade, said passages in each being aligned;

(f) a guide body having an aperture therethrough for receiving said guide shaft and holding said guide pad in position, said guide shaft and guide body being threadingly engaged for longitudinal movement of said guide shaft relative to said guide body and saw blade when said guide shaft is rotated;

(g) means for locking said guide shaft in position relative to said saw blade; and (h) a rotatable swivel joint attached to the end of each said guide shaft opposite said guide pad for attaching a fluid conduit to said guide shaft in communication with said passages, thereby permitting said guide shaft to be rotated without disconnecting or moving said conduit.

8. A resaw apparatus for longitudinally cutting an elongate wood cant, comprising:

(a) a circular saw for cutting said cant, said saw including a vertically-oriented circular saw blade and means for rotating said blade, said blade having two laterally-facing sides, a center axis of rotation, and a cutting edge, a portion of said cutting edge passing through a forward position for cutting said cant as said blade is rotated;

(b) table means disposed adjacent said blade for supporting said cant as it is cut by said saw, said table means having a flat horizontally-oriented supporting plate;

(c) guide means disposed adjacent said sides of said saw blade between the respective horizontal locations of said center axis and said forward position for keeping lateral movement of said blade within a predetermined tolerance;

(d) two sets of cylindrical rollers disposed on opposite sides of a predetermined path and defining a space therebetween for urging said cant longitudinally along said predetermined path against said saw blade at said forward position such that said cant is cut longitudinally along a predetermined line, each set having two such rollers whose axes are oriented substantially perpendicular to said supporting plate, and each said set of rollers substantially defining a respective plane tangent to said two rollers of said roller set, said planes being oriented substantially perpendicular to said surface of said table means;

(e) pressure means connected to said two sets of rollers for urging said sets toward one another such that they pinch said cant therebetween;

(f) drive means connected to said rollers for rotating said rollers about their respective axes to urge said cant along said path;

(g) two movable carriages for supporting said two sets of rollers respectively;

(h) two elongate slides respectively for each carriage, each slide being longitudinally oriented substantially perpendicular to said cant path and having a base plate, a gib plate and a cover plate, said base plate and cover plate being wider than said gib plate and being separated thereby to form a space between said base plate and said cover plate, said space being centered substantially halfway between the ends of said rollers and above said supporting plate, an edge of a respective carriage being placed within said space, and a plurality of bolts threadingly inserted through said gib plate and communicating with said edge of said carriage for adjusting the alignment of said edge with respect to said gib plate; and (i) lateral adjustment means connected to said table means and said carriages for moving said carriages laterally on said slides relative to said cant path.

9. A method for cutting an elongate wood cant with a thin-kerfed circular saw blade having a central axis of rotation and a cutting edge with a plurality of gullets therein, comprising the steps of:

(a) rotating said saw blade through a forward cutting position;

(b) restraining said saw blade to within a predetermined tolerance of lateral movement by positioning a pair of guides on opposite sides of said blade at a position ahead of said axis of rotation;

(c) inserting said cant between two sets of at least two parallel rollers each, said two sets being laterally spaced from one another with respect to said cant;

(d) rotating at least one roller of each said set, rollers in one said set being rotated in the opposite direction as rollers in the other said set; and (e) pinching said cant between said two sets of rollers by applying lateral force to said rollers substantially halfway between the ends of said rollers, thereby urging said cant against said saw blade.

10. The method of claim 9 further comprising the step of cooling said blade and reducing friction between said blade and said guides by feeding a cooling fluid to said blade between said blade and said guides through passages in said guides.

* * * * *